United States Patent
Pintiysky et al.

(10) Patent No.: US 9,740,864 B2
(45) Date of Patent: *Aug. 22, 2017

(54) SYSTEM AND METHOD FOR EMULATION OF FILES USING MULTIPLE IMAGES OF THE EMULATOR STATE

(71) Applicant: Kaspersky Lab ZAO, Moscow (RU)

(72) Inventors: Vladislav V. Pintiysky, Moscow (RU); Sergey Y. Belov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,418

(22) Filed: Jun. 24, 2015

(65) Prior Publication Data

US 2015/0294112 A1 Oct. 15, 2015

Related U.S. Application Data

(63) Continuation of application No. 14/221,488, filed on Mar. 21, 2014, now Pat. No. 9,111,096.

(30) Foreign Application Priority Data

Oct. 24, 2013 (RU) .................................. 2013147291

(51) Int. Cl.
*G06F 21/00* (2013.01)
*G06F 21/56* (2013.01)
(Continued)

(52) U.S. Cl.
CPC ............ *G06F 21/566* (2013.01); *G06F 9/455* (2013.01); *G06F 11/1438* (2013.01);
(Continued)

(58) Field of Classification Search
None
See application file for complete search history.

(56) References Cited

U.S. PATENT DOCUMENTS 6,067,410 A 5/2000 Nachenberg
6,338,147 B1 1/2002 Meth et al.
(Continued)

FOREIGN PATENT DOCUMENTS

EP 2237186 A2 5/2010
RU 101235 U1 1/2011
WO 2011018271 A1 2/2011

*Primary Examiner* — Maung Lwin
(74) *Attorney, Agent, or Firm* — Arent Fox LLP; Michael Fainberg

(57) ABSTRACT

Disclosed are systems, methods, and computer program products for emulation of files using multiple images of the emulator state. In one example, the method includes loading the file into an emulator of the computer system; initiating emulation of the file by the emulator; storing an initial image of an initial state of the emulator; continuing the emulation of the file and detecting occurrence of a condition that results during the emulation of the file; creating and storing a new image of a next state of the emulator when an occurrence of the condition is detected; determining whether the emulation of the file has terminated correctly or incorrectly; and upon determining that the emulation of the file has terminated incorrectly, loading the new image of the next state into the emulator and resuming the emulation of the file from the next state of the emulator.

15 Claims, 6 Drawing Sheets

(51) Int. Cl.
  *H04L 29/06* (2006.01)
  *G06F 9/455* (2006.01)
  *G06F 11/14* (2006.01)

(52) U.S. Cl.
  CPC ........ *G06F 11/1479* (2013.01); *G06F 21/567* (2013.01); *H04L 63/145* (2013.01); *G06F 11/1471* (2013.01); *G06F 2221/034* (2013.01)

(56) References Cited

U.S. PATENT DOCUMENTS

| | | | |
|---|---|---|---|
| 6,374,207 B1 | 4/2002 | Li et al. | |
| 6,415,436 B1* | 7/2002 | Patel | G06F 9/455 |
| | | | 703/23 |
| 6,453,278 B1* | 9/2002 | Favor | G06F 7/74 |
| | | | 703/26 |
| 6,795,966 B1* | 9/2004 | Lim | G06F 11/1438 |
| | | | 718/1 |
| 7,328,145 B2* | 2/2008 | Jackson | G06F 9/45504 |
| | | | 370/295 |
| 7,403,887 B1* | 7/2008 | Bishop | G06F 12/1009 |
| | | | 703/26 |
| 7,664,626 B1 | 2/2010 | Ferrie | |
| 7,673,201 B1* | 3/2010 | Chan | G06F 1/04 |
| | | | 326/40 |
| 7,849,297 B2 | 12/2010 | Kissell | |
| 8,370,932 B2* | 2/2013 | Adams | G06F 21/566 |
| | | | 713/188 |
| 8,555,386 B1 | 10/2013 | Belov | |
| 8,805,664 B1* | 8/2014 | Han | G06F 17/5009 |
| | | | 703/13 |
| 9,111,096 B2* | 8/2015 | Pintiysky | G06F 21/566 |
| 2006/0155525 A1* | 7/2006 | Aguilar | G06F 17/5022 |
| | | | 703/26 |
| 2007/0050682 A1* | 3/2007 | Takuma | G06F 11/3652 |
| | | | 714/45 |
| 2008/0127114 A1* | 5/2008 | Vasudevan | G06F 21/566 |
| | | | 717/129 |
| 2008/0263658 A1 | 10/2008 | Michael et al. | |
| 2008/0320594 A1 | 12/2008 | Jiang | |
| 2009/0119310 A1 | 5/2009 | Larue et al. | |
| 2010/0011243 A1* | 1/2010 | Locasto | G06F 11/1438 |
| | | | 714/15 |
| 2010/0115620 A1* | 5/2010 | Alme | G06F 21/563 |
| | | | 726/24 |
| 2011/0066786 A1* | 3/2011 | Colbert | G06F 9/45558 |
| | | | 711/6 |
| 2011/0219449 A1* | 9/2011 | St. Neitzel | G06F 11/00 |
| | | | 726/23 |
| 2012/0117652 A1 | 5/2012 | Manni | |
| 2012/0174224 A1 | 7/2012 | Thomas et al. | |
| 2012/0233578 A1 | 9/2012 | Karlsson | |
| 2012/0246630 A1* | 9/2012 | Kuzins | G06F 8/61 |
| | | | 717/169 |
| 2013/0097120 A1 | 4/2013 | Mummidi | |
| 2013/0110490 A1* | 5/2013 | Letz | G06F 11/2242 |
| | | | 703/21 |
| 2013/0155083 A1* | 6/2013 | McKenzie | G06T 1/20 |
| | | | 345/522 |
| 2013/0317802 A1* | 11/2013 | Yamazaki | G06F 17/5036 |
| | | | 703/14 |

* cited by examiner

SYSTEM AND METHOD FOR EMULATION OF FILES USING MULTIPLE IMAGES OF THE EMULATOR STATE

CROSS-REFERENCE TO RELATED APPLICATIONS

This application is a continuation of U.S. application Ser. No. 14/221,488 filed on Mar. 21, 2014, which claims benefit of priority under 35 U.S.C. 119(a)-(d) to a Russian Application No. 2013147291 filed on Oct. 24, 2013, both of which are incorporated by reference herein.

TECHNICAL FIELD

The disclosure relates generally to the field of information security, and more specifically, to systems, methods and computer program products for emulation of files using multiple images of the emulator state.

BACKGROUND

The code of modern software, including malware, constitutes a complex set of instructions for jumps, calls, loops and other operations. It should be noted that the executable files are becoming increasingly complex due to the increasing popularity of high-level programming languages and also the greater complexity of computer hardware and operating systems. This applies both to trusted programs and to malicious ones. Malicious programs can perform a number of characteristic actions, such as stealing passwords and other confidential user data, adding a computer to a bot network to carry out DDoS attacks or send out spam mail, blocking the correct operations of the system for purposes of extortion, and other malicious actions that are unwanted by the user and harmful to the user's computer system.

One of the ways of investigating potentially harmful programs is by antivirus applications that may use a program emulator to analyzing the behavior of the programs. There are various methods of emulation. One of them is a program imitation of the processor, the memory, and other devices by creating virtual copies of the registers of the processor, memory, and instruction set of the processor. Thus, the program instructions are executed not on the real processor, but on its virtual copy, and the calls of the system API functions are emulated and the emulated result of the working of the function is sent in response.

It should be noted that the process of initializing an emulator can be rather resource-intensive. The initialization of the emulator should involve not only creating a virtual copy of the necessary hardware (processor, working memory), but also virtual copies of a number of key components of the operating system (OS) in which the emulation of the execution of the application will occur. Among the key components of the OS one can mention, for example, the kernel of the operating system, which is responsible for its necessary mechanisms of operation, such as the processing of interrupts and exceptions, core drivers, memory manager, and so forth. For a proper "mimicking" (emulating) of the working OS, one needs to repeat the process of its loading, albeit in a rather simplified form.

FIG. 1 shows the process of loading the Windows operating system. In step 101, Windows Boot Manager may be loaded, being responsible for finding the installed OS Windows and enabling the selecting of the loading of any OS found. Next, in step 102, the loading of the basic drivers may occur, which are responsible, for example, for enabling a working with the hard disk partition on which the selected OS is installed (i.e., the file system driver is loaded). Next, the necessary part of OS kernel may be read from the disk and loaded into memory in step 103, for example, Ntoskrnl.exe and hal.dll, and the registry, memory manager, object manager, etc., are initialized. In step 104, the sessions manager (smss.exe) is loaded, which is responsible for loading the system variables, the Win32 subsystem, and the further loading of winlogon.exe in step 105. After the user successfully performs the authentication in step 106, the applications and services with autorun registry key are loaded, and then the OS will be fully ready to interact with the user, awaiting the starting of applications and the input of data.

For the emulation process, it is not necessary to fully emulate the loading of the operating system. For example, steps 101 and 102 can be omitted, leaving only steps 103 and 104 in simplified form. That is, it will be sufficient to emulate the most important functionality for the correct functioning of the OS, which is required for application emulation. For Win32 applications, it will be necessary to emulate the starting of smss.exe with subsequent starting of csrss.exe, which initializes the Windows subsystem and enables creating of processes and threads. Since the emulation of a potentially harmful application requires the creating of a more detailed operating environment (such as the emulation of other processes or services), it is also necessary to emulate the starting of winlogon.exe with the subsequent "starting" of processes like explorer.exe and services.exe, it being possible to emulate the starting of svchost processes from the latter. By the term "starting" in this case is meant the recreating in the emulator of the same processes that occur when the processes are created within the real OS, albeit in greatly simplified form. Such an approach lets one recreate the real OS to a sufficient degree for starting practically any application designed to work in the given OS. For potentially harmful applications, such a level of detail in recreating the environment is also necessary, both in order to get around possible anti-emulation tricks that might include the actual checking for the presence of started services, system variables values, and other elements which are present in the real OS, and in order for the malicious functional to be implemented, which may be aimed at certain applications. As an example, one can mention the process explorer.exe, which is often the target of attack, the web browser processes, for which a corresponding exploit can be utilized, and so on.

Thus, the problem of creating a corresponding environment for emulation of a potentially harmful application requires the most detailed possible recreating of the real OS and the applications started in it. The process of initialization of such an environment can take up much time and resources (starting of the emulation process, loading from hard disk into memory all necessary data for the initialization of such virtual structures as the file system, the registry, and so on), which shortens the time for the actual emulation of the application code.

At present, approaches exist for preserving the state of an emulated environment. For example, the emulator QEMU supports the creation of images, including those which preclude the need to perform the process of loading of the OS. However, the image is preserved on disk only at the request of the user, and it does not support any structure for preserving a series of recorded images. This approach concurs entirely with the operating mode of a virtual machine manager.

However, the known approaches do not involve automatic creation of images of an emulated system, or the state of execution of an emulated application that would make it possible to track down every possible branching of the execution of the program code. From the standpoint of the analysis of malicious programs, such an approach would be able to get around anti-emulation tricks.

The creators of malware use various tricks to defeat emulation of the program code, which can be based on limitations relating to the emulation process and the implementing of an emulator in antivirus solutions. The emulator creates a virtual copy of the processor, the computer components and the operating system (OS) only to a limited extent with curtailed capabilities, since the full recreation of all capabilities of such a processor or system API functions is not possible for a number of reasons: the immense labor for such a development, the presence of undocumented functions, the large drop in performance when such an emulator is working. Thus, the creators of malware can resort to the following approaches for detecting the fact of an execution in an emulated environment:

The calling of an undocumented or seldom used API function.

The execution of a number of instructions of the central processor with subsequent checking, for example, of a number of flags that are set. If the emulation of the processor commands is insufficiently precise, a number of flags might have values different from those which would have been set when executed by real processor.

Checking of the correct execution of an API function. The checking can be very complicated and involve an analysis of the error codes returned during an incorrect call or a checking of the processor registers values.

Looking for certain bytes in memory. For example, a byte by byte search for the header MZ in memory after the loading of kernel32.dll when starting the process. In the OS Vista 64, a 64 kb alignment is used for the kernel32.dll, and the region between the header and the first section will not be mapped in the address space of the process. If an access to this is attempted, an exception will occur. If the exception was not registered, the standard OS exceptions handler will be called up, and this will terminate the process.

SUMMARY

Disclosed are systems, methods, and computer program products for emulation of files using multiple images of the emulator state. In one example aspect, the method includes loading the file into an emulator of the computer system; initiating emulation of the file by the emulator; storing an initial image of an initial state of the emulator; continuing the emulation of the file and detecting occurrence of a condition that results during the emulation of the file; creating and storing a new image of a next state of the emulator when an occurrence of the condition is detected; determining whether the emulation of the file has terminated correctly or incorrectly; and upon determining that the emulation of the file has terminated incorrectly, loading the new image of the next state into the emulator and resuming the emulation of the file from the next state of the emulator.

In another example aspect, the method further includes, upon resuming the emulation of the file from the next state of the emulator, determining whether the emulation of the file terminates correctly or incorrectly; and if the emulation of the file terminates incorrectly, loading the initial image of the initial state into the emulator and resuming the emulation of the file from the initial state of the emulator.

In another example aspect, the method further includes not resuming the emulation of the file when the emulation was determined to terminate correctly.

In another example aspect, the conditions include one or more of an occurrence of branches in a code of the emulated file, detection of an anti-emulation trick, emulation of a predefined number of instructions, and a predetermined time interval.

In another example aspect, the method further includes determining whether the emulation was terminated correctly by at least one of detecting a harmful behavior of the emulated file, emulating the file for a predetermined period of time, and emulating a predefined number of instructions.

In another example aspect, the method further includes determining whether the emulation was terminated incorrectly by at least one of: detecting an occurrence of an anti-emulation trick, detecting absence of a required library, and detecting an occurrence of an unhandled exception leading to termination of the emulation.

In another example aspect, the method further includes storing the initial image of the initial state of the emulator and the new image of the next state of the emulator in a tree data structure.

In one example aspect, a system for emulating a file on a computer system includes a hardware processor configured to: load the file into an emulator of the computer system; initiate emulation of the file by the emulator; store an initial image of an initial state of the emulator; continue the emulation of the file and detecting occurrence of a condition that results during the emulation of the file; create and storing a new image of a next state of the emulator when an occurrence of the condition is detected; determine whether the emulation of the file has terminated correctly or incorrectly; and upon determining that the emulation of the file has terminated incorrectly, load the new image of the next state into the emulator and resuming the emulation of the file from the next state of the emulator.

In one example aspect, a non-transitory computer program product stored on a non-transitory computer-readable storage medium, the computer program product comprising computer-executable instructions for emulating a file on a computer system, including instructions for: loading the file into an emulator of the computer system; initiating emulation of the file by the emulator; storing an initial image of an initial state of the emulator; continuing the emulation of the file and detecting occurrence of a condition that results during the emulation of the file; creating and storing a new image of a next state of the emulator when an occurrence of the condition is detected; determining whether the emulation of the file has terminated correctly or incorrectly; and upon determining that the emulation of the file has terminated incorrectly, loading the new image of the next state into the emulator and resuming the emulation of the file from the next state of the emulator.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for emulating a file on a computer system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 2:
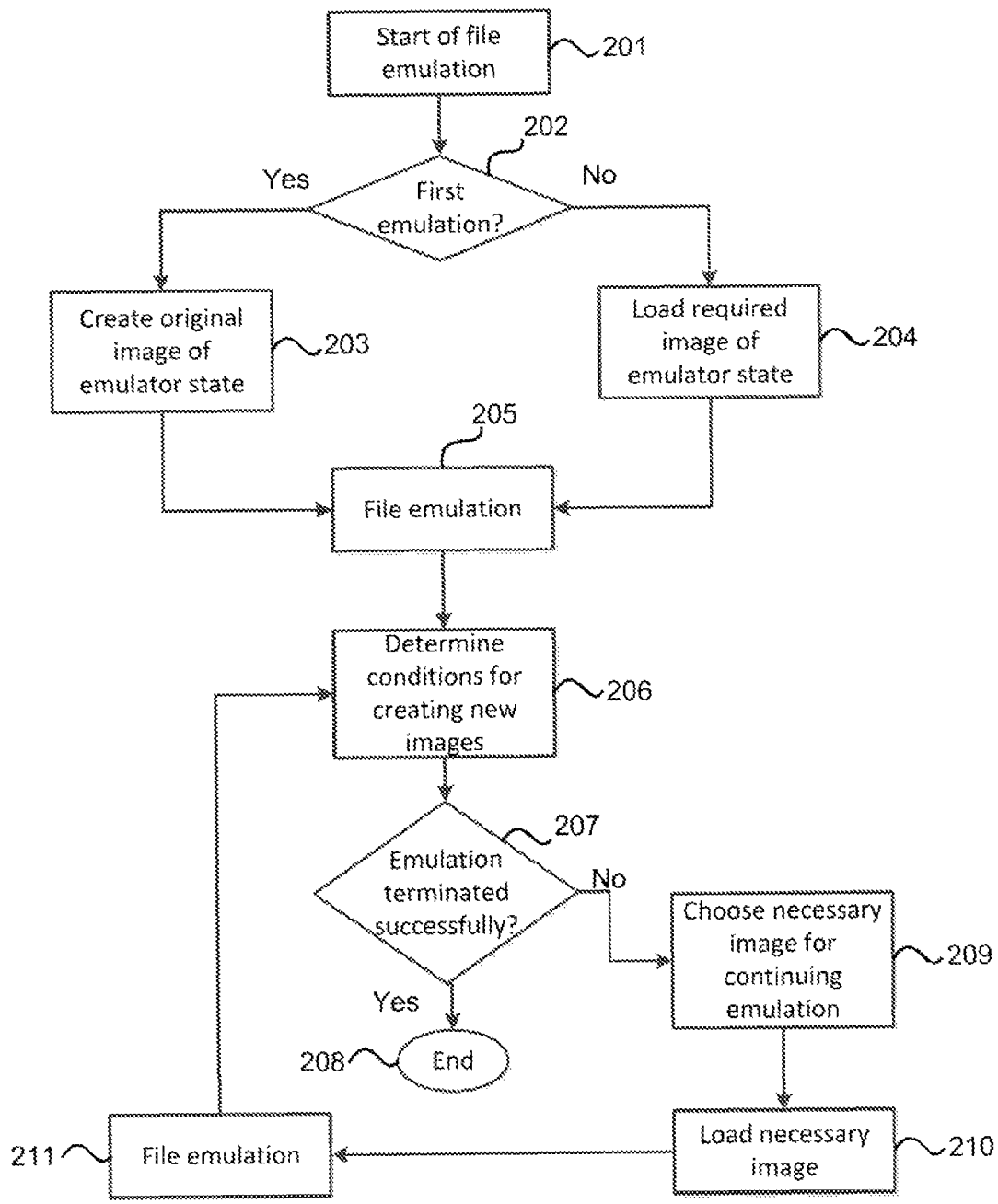
FIG. 2 is a flow diagram illustrating an example method for emulating a file cording to one aspect of the invention.

FIG. 2 is a flow diagram illustrating an example method for emulating a file on a computer system according to one aspect of the invention. In step 201 the start of the file emulation may occur. There may be several variants of when it is necessary to emulate a file:

The file is unknown and it needs to be emulated to determine its possible maliciousness;

Emulation is necessary to determine all possible error codes when running the emulation, for example, of an application installer;

Emulation is necessary to investigate the functionality of the application, when it is necessary to determine how the system calls are used, the list of required third-party libraries, and so on.

Figure 1:
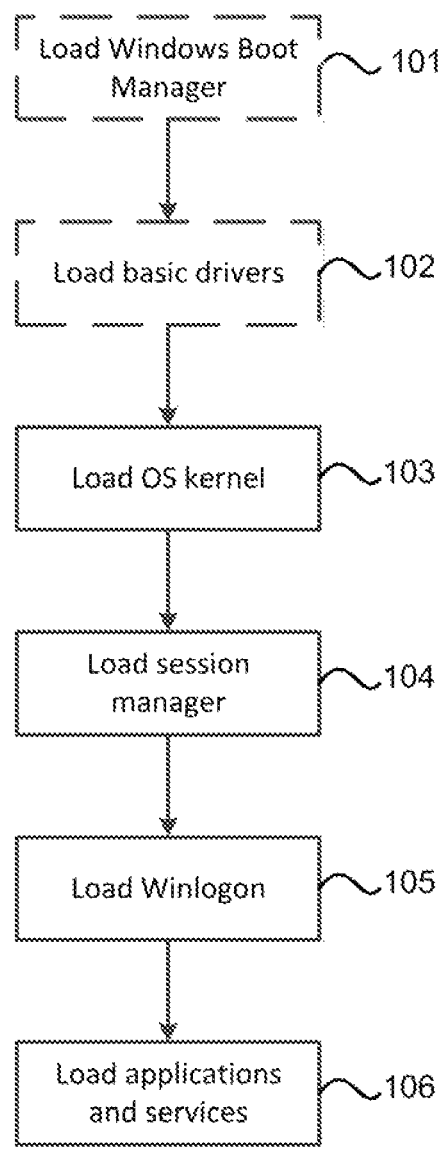
FIG. 1 shows the process of loading the Windows operating system.

In step 202 it may be determined whether the emulation is being run the first time or not. If the emulation is occurring for the first time, then in step 203 an original image of the emulator state may be created, which includes the minimum required OS functional as described in the context of FIG. 1 above. Besides the initialization of the OS functional, a module for detecting malicious code, the state of the virtual file system, the virtual registry, and the tree of virtual objects may be loaded into the emulator. Different images of the state of the emulator may also include the processes loaded in memory (such as processes of important services), open handlers of resources (such as files), and processes with threads executing code (such as an executable file being emulated). Consequently, the image constitutes a copy of all the enumerated objects in memory that is preferable to store in the operating memory to speed up the procedures for storage and restoration.

If the emulation is not being done for the first time (for example, the emulation of another file was done previously), then in step 204 the required image of the emulator state may be determined, which is loaded into the emulator for subsequent emulation of the file in step 205. The determining of the required image of the emulator state will be described below.

When running the emulation in step 206, a determination may be made of the fulfilling of the necessary conditions for creating new images of the emulator state. As an example of such conditions, the following occurrences can be mentioned:

Branches in the code (conditional jumps).

Determining by means of signature the use of a potential anti-emulation trick (such as the calling of seldom used API functions with subsequent checking of the result of their execution).

Emulation of a certain number of instructions.

Periodic creation of images at predetermined intervals of time.

Next, in step 207, it may be determined whether the emulation was terminated successfully or not. A successful result in step 208 may entail either the discovery of harmful behavior during the emulation of the file being executed, or a termination after the time elapses for after a certain number of instructions are executed). An incorrect termination of the emulation process may entail too quick of a termination of the emulated process (possible triggering of one of the anti-emulation tricks), absence of the required libraries, or an unhandled exception leading to termination of the process (this may be connected with errors in the program code). Upon incorrect termination of the emulation process, in step 209 the necessary image may be chosen for continuing the emulation (this is described more fully in the context of FIG. 3). In step 210 the necessary image may be loaded into the emulator and the emulation may resume in step 211, which proceeds back to step 206. Thus, such an approach may enable a correct terminating of the emulation even for those executable files whose emulation would have terminated incorrectly when using standard methods of emulation.

Figure 3:
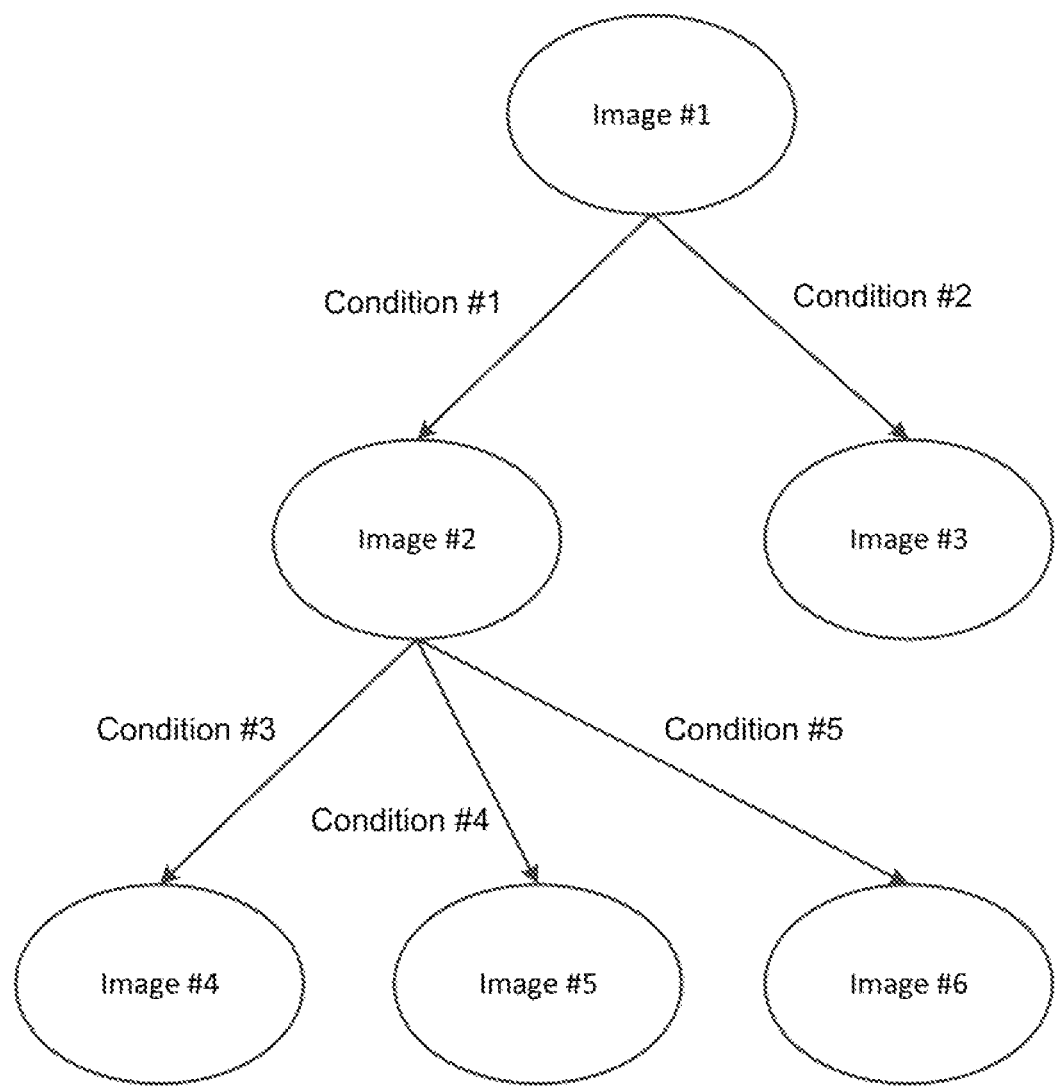
FIG. 3 is a tree diagram of the storing of images of the emulator state according to one aspect of the invention.

FIG. 3 shows a tree diagram of the storing of images of the emulator state according to one aspect of the invention. Such a tree structure may be able to store images of the emulator state in dependence on one of the conditions:

Loading into memory of an image of the executable file needing to be emulated. Returning to such an image lets the emulation of the executable file resume, as it were, "from scratch."

Loading into memory of the required process, such as Internet Explorer. The use of this image will enable an emulation of possible malicious files that requires the presence of a started Internet Explorer process (in whose address space a malicious code may have been written and executed later) for its execution.

The occurrence of certain actions during the emulation of the code of the executable file. During the emulation, there may occur conditional jumps, which may be part of the checks for anti-emulation tricks (for example, when certain checks are performed unsuccessfully, the emulated program simply terminates its execution).

For example, images of the emulator state may be preserved in the following manner. Image #1 may be the original Windows image that includes the state of the system immediately after loading. Condition #1 may be the loading into the emulator of the file being executed, which needs to be emulated for presence of malicious code. Thus, image #2 differs from image #1 in that the process being emulated has already been loaded into memory. Consequently, the condition for creating an image also determines the difference between the images (taking into account information on the number of emulated instructions, the functions called up, the change in resource descriptors, and so on). Afterwards, the fulfillment of new conditions will lead to the creation of new images. For example, a branching in the code is condition #3 and may lead to the creation of image #4, which corresponds to the state of the emulator before the execution of the conditional jump in the code. Condition #4 may be a triggering of an antivirus signature, indicating the possible use of anti-emulation tricks, which will lead to the creation of image #5. Afterwards, if the emulation of the executable file is terminated incorrectly in step 207, moving along the tree structure of preserved emulator images will make it possible to load the image of the emulator state prior to the incorrect termination of the emulation process. In moving along such a tree to find an image, one first goes to the image describing the state of the emulator prior to the incorrect termination of the emulation process. If the emulation process again terminates incorrectly, it is possible to load the change in the image of the emulator state one level higher up (i.e., an even earlier version of the emulator state), until one gets to the state when the file being emulated was loaded into the emulator. If the conditions for creation of the images included, say, a conditional jump, then when loading the image at the corresponding condition the jump will be done to the other code branch. An example of a change in state of the emulator might be:

Jumping to the other code branch at a conditional jump;
Change in the status of resource handlers (such as files). In this case, open files or connections can be forced to remain unclosed.
Reversing previously made changes. One example might be to clear the data transfer buffer or change the branch of a registry.
Changing the return value of an executed function. For example, if the execution of a function as a result of the emulation returns a value FALSE, the value can be forced to become TRUE.

It should be noted that saving images of the emulator state is most preferable in the operating memory to accelerate the processes of saving and restoring of loaded images. The size of an image may vary from several tens of megabytes (loaded OS) to several hundreds of megabytes or even gigabytes, depending on the loaded processes. For operating memory economy, some of the images can be kept on disk, or only the difference (diff) between images can be used, which may be minimal if the conditions for creation of the images occur rather often during the emulation.

Figure 4:
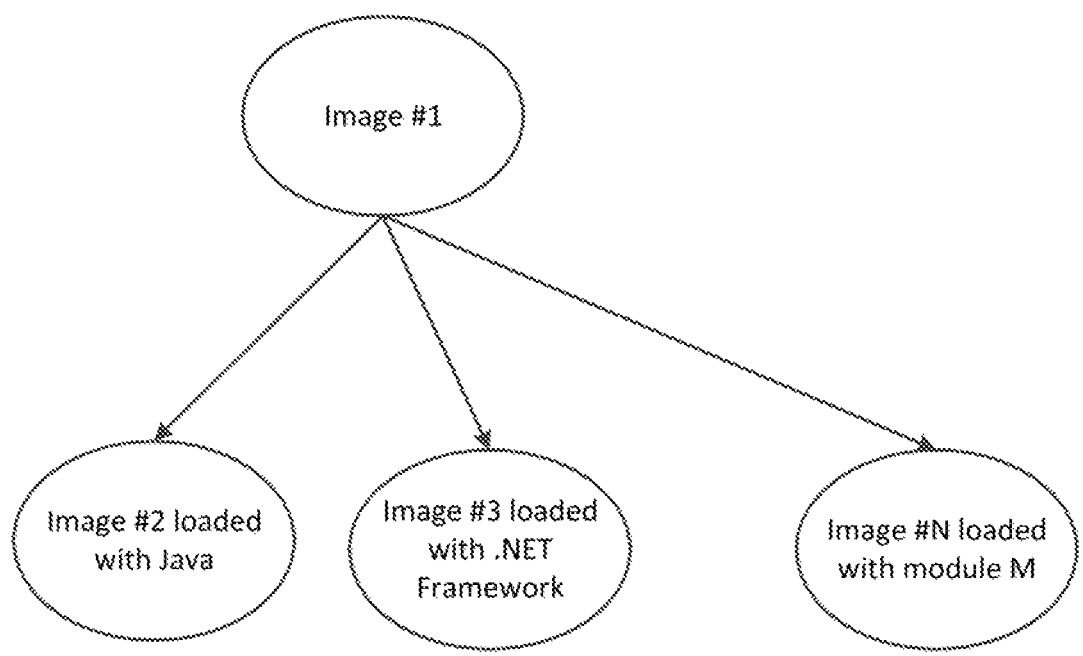
FIG. 4 illustrates possible images of state of the emulator in dependence on the processes loaded according to one aspect of the invention.

FIG. 4 illustrates possible images of the emulator state depending on the processes loaded according to one aspect of the invention. For example, one may use the loaded OS as image #1, and the following images contain different loaded processes, such as Java, .NET, Explorer, Outlook and other such processes. The images may also contain certain sets of started processes that may be needed for a successful emulation of certain files having a series of dependencies. For example, the emulation of an unknown file requires the virtual Java machine process, in which the malicious code (exploit) will be loaded, and afterwards making use of a vulnerability (possibly unknown), while Windows network services might be needed for the subsequent execution of the malicious functional.

Figure 5:
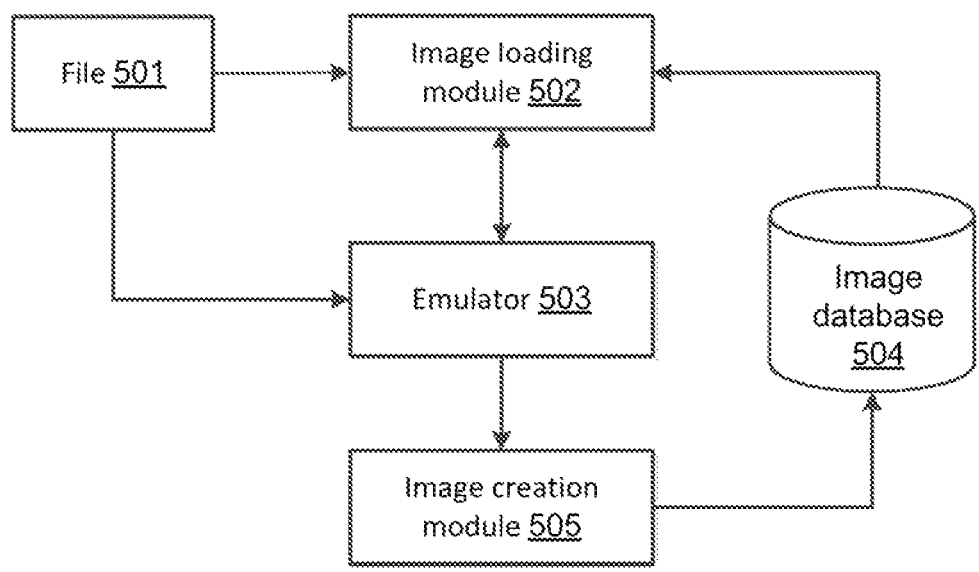
FIG. 5 is a diagram of a system for emulating a file according to one aspect of the invention.

FIG. 5 is a diagram of a system for emulating a file according to one aspect of the invention. When it is necessary to emulate an unknown file 501, the emulator 503 may be used, which may load the necessary image by means of the image loading module 502 into the emulator. The module 502 may determine the required image in the database of images 504 based on the criteria described in the context of FIG. 3. At the same time, the emulator 503 may send a request to create an image to the image creation module 505 on the basis of one of the conditions necessitating the creation of images (as discussed above). In one aspect, the module 505 may keep a tree structure of images of the emulator state, where the transitions from certain nodes of the tree to other nodes are based on the indicated conditions. The database 504 itself may be kept in the computers operating memory, which is the most preferable aspect.

The use of the system shown in FIG. 5 lets one solve a number of problems:

Speed up the loading of the emulator state when emulating executable files, since the loading of the image in a preferred aspect is an operation of copying in operating memory;
Determine possible error codes in the subsequent execution of the application (such as when starting an installer);
Circumvent possible anti-emulation tricks in order to identify a malicious function.

Figure 6:
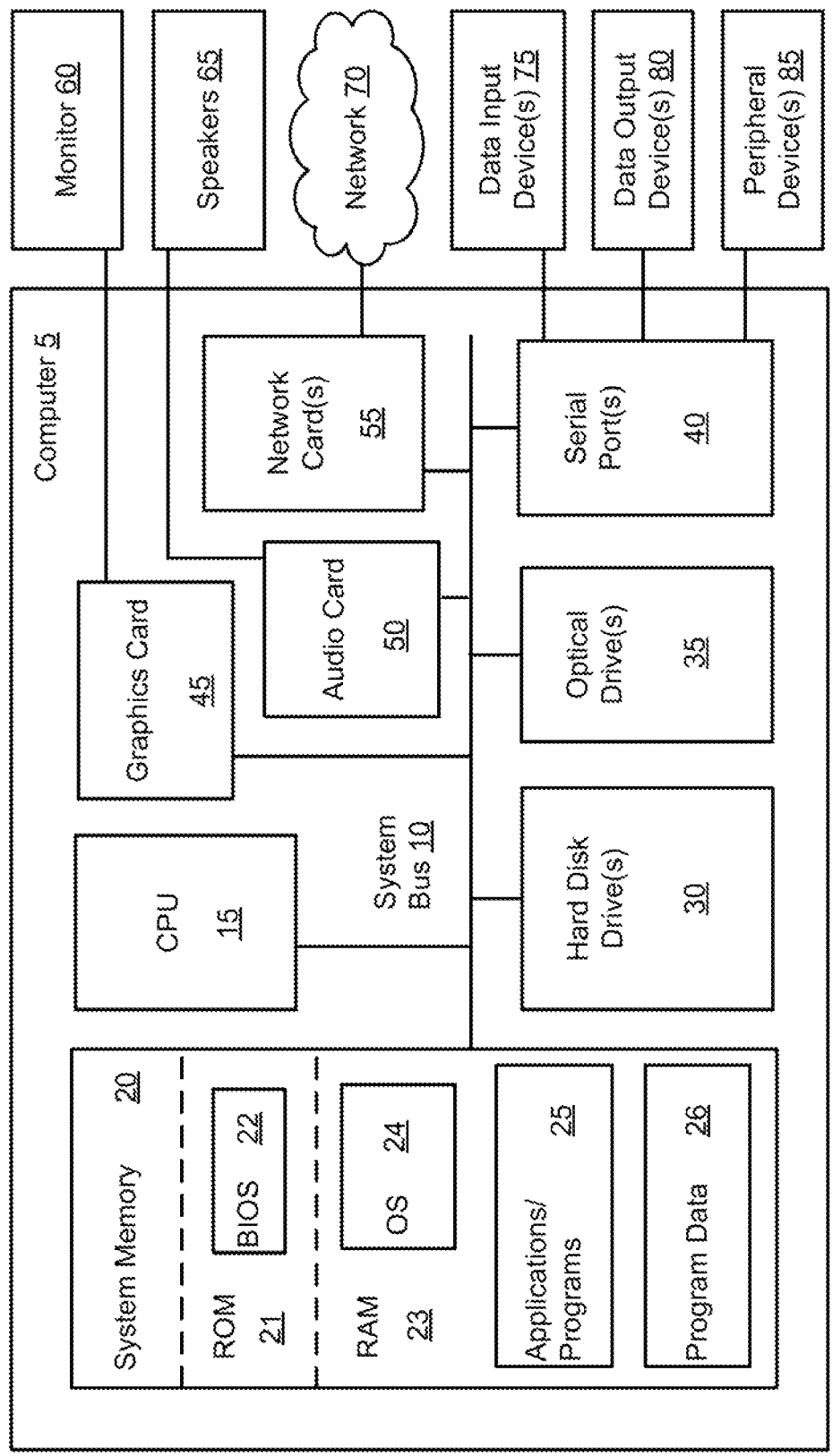
FIG. 6 is a diagram illustrating an example aspect of a general-purpose computer system on which are implemented the systems and methods for emulating a file in accordance with aspects of the invention.

FIG. 6 is a diagram illustrating an example aspect of a general-purpose computer system 5 on which are implemented the systems and methods for emulating a file in accordance with aspects of the invention. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), including the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for emulating a file on a computer system, the method comprising:
   loading the file into an emulator of the computer system;
   initiating emulation of the file by the emulator;
   storing a first image of an initial state of the emulator in a tree data structure;
   continuing the emulation of the file and detecting an occurrence of a condition that results during the emulation of the file;
   creating and storing a second image of a second state of the emulator in the tree data structure when the occurrence of the condition is detected;
   determining that the emulation of the file has terminated correctly in response to at least detecting a harmful behavior of the file during the emulation;
   determining that the emulation of the file has terminated incorrectly in response to detecting an occurrence of an anti-emulation trick; and
   upon determining that the emulation of the file has terminated incorrectly,
      navigating along the tree data structure to identify the second image of the second state of the emulator as a state of the emulator prior to the incorrect termination,
      loading the second image of the second state into the emulator and
      resuming the emulation of the file from the second state of the emulators;
      performing a change to a state of the resumed emulation to circumvent the anti-emulation trick, wherein the change to the state of the resumed emulation includes at least one of a jump to a different code branch at a conditional jump, a change in a status of a resource handler, a reversal of a previously made change, and a change to a return value an executed function.

2. The method of claim 1, further comprising:
   upon resuming the emulation of the file from the second state of the emulator, determining whether the emulation of the file terminates correctly or incorrectly; and
   if the emulation of the file terminates incorrectly, loading the first image of the initial state into the emulator and resuming the emulation of the file from the initial state of the emulator.

3. The method of claim 1, further comprising not resuming the emulation of the file when the emulation was determined to terminate correctly.

4. The method of claim 1, wherein determining whether the emulation was terminated correctly further comprises detecting at least one of: emulating the file for a predetermined period of time, and emulating a predefined number of instructions.

5. The method of claim 1, wherein determining whether the emulation was terminated incorrectly further comprises at least one of detecting absence of a required library, and detecting an occurrence of an unhandled exception leading to termination of the emulation.

6. A system for emulating a file on a computer system, the system comprising:
a hardware processor configured to:
load the file into an emulator of the computer system;
initiate emulation of the file by the emulator;
store a first image of an initial state of the emulator in a tree data structure;
continue the emulation of the file and detect an occurrence of a condition that results during the emulation of the file;
create and store a second image of a second state of the emulator in the tree data structure when the occurrence of the condition is detected;
determine that the emulation of the file has terminated correctly in response to at least detecting a harmful behavior of the file during the emulation;
determine that the emulation of the file has terminated incorrectly in response to detecting an occurrence of an anti-emulation trick; and
upon determining that the emulation of the file has terminated incorrectly,
navigate along the tree data structure to identify the second image of the second state of the emulator as a state of the emulator prior to the incorrect termination,
load the second image of the second state into the emulator and resume the emulation of the file from the second state of the emulator;
performing a change to a state of the resumed emulation to circumvent the anti-emulation trick, wherein the change to the state of the resumed emulation includes at least one of a jump to a different code branch at a conditional jump, a change in a status of a resource handler, a reversal of a previously made change, and a change to a return value of an executed function.

7. The system of claim 6, wherein the hardware processor is further configured to:
upon resuming the emulation of the file from the second state of the emulator, determine whether the emulation of the file terminates correctly or incorrectly; and
if the emulation of the file terminates incorrectly, load the first image of the initial state into the emulator and resume the emulation of the file from the initial state of the emulator.

8. The system of claim 6, wherein the hardware processor is further configured to not resume the emulation of the file when the emulation was determined to terminate correctly.

9. The system of claim 6, wherein the hardware processor is further configured to determine whether emulation was terminated correctly based by at least one of: emulating the file for a predetermined period of time, and emulating a predefined number of instructions.

10. The system of claim 6, wherein the hardware processor is further configured to determine whether emulation was terminated incorrectly by at least one of detecting absence of a required library, and detecting an occurrence of an unhandled exception leading to termination of the emulation.

11. A non-transitory computer program product stored on a non-transitory computer-readable storage medium, the computer program product comprising computer-executable instructions for emulating a file on a computer system, including instructions for:
loading the file into an emulator of the computer system;
initiating emulation of the file by the emulator;
storing a first image of an initial state of the emulator in a tree data structure;
continuing the emulation of the file and detecting an occurrence of a condition that results during the emulation of the file;
creating and storing a second image of a second state of the emulator in the tree data structure when the occurrence of the condition is detected;
determining that the emulation of the file has terminated correctly in response to at least detecting a harmful behavior of the file during the emulation;
determining that the emulation of the file has terminated incorrectly in response to detecting an occurrence of an anti-emulation trick; and
upon determining that the emulation of the file has terminated incorrectly,
navigating along the tree data structure to identify the second image of the second state of the emulator as a state of the emulator prior to the incorrect termination,
loading the second image of the second state into the emulator and
resuming the emulation of the file from the second state of the emulator;
performing a change to a state of the resumed emulation to circumvent the anti-emulation trick, wherein the change to the state of the resumed emulation includes at least one of a jump to a different code branch at a conditional jump, a change in a status of a resource handler, a reversal of a previously made change, and a change to a return value of an executed function.

12. The non-transitory computer program product of claim 11, further comprising instructions for:
upon resuming the emulation of the file from the second state of the emulator, determining whether the emulation of the file terminates correctly or incorrectly; and
if the emulation of the file terminates incorrectly, loading the first image of the initial state into the emulator and resuming the emulation of the file from the initial state of the emulator.

13. The non-transitory computer program product of claim 11, further comprising instructions for not resuming the emulation of the file when the emulation was determined to terminate correctly.

14. The non-transitory computer program product of claim 11, wherein the instructions for determining whether the emulation was terminated correctly are based upon at least one of: emulating the file for a predetermined period of time, and emulating a predefined number of instructions.

15. The non-transitory computer program product of claim 11, wherein the instructions for determining whether the emulation was terminated incorrectly are based upon at least one of detecting absence of a required library, and detecting an occurrence of an unhandled exception leading to termination of the emulation.

\* \* \* \* \*